(No Model.) 6 Sheets—Sheet 1.
O. B. PECK.
CENTRIFUGAL SEPARATOR.
No. 560,621. Patented May 19, 1896.
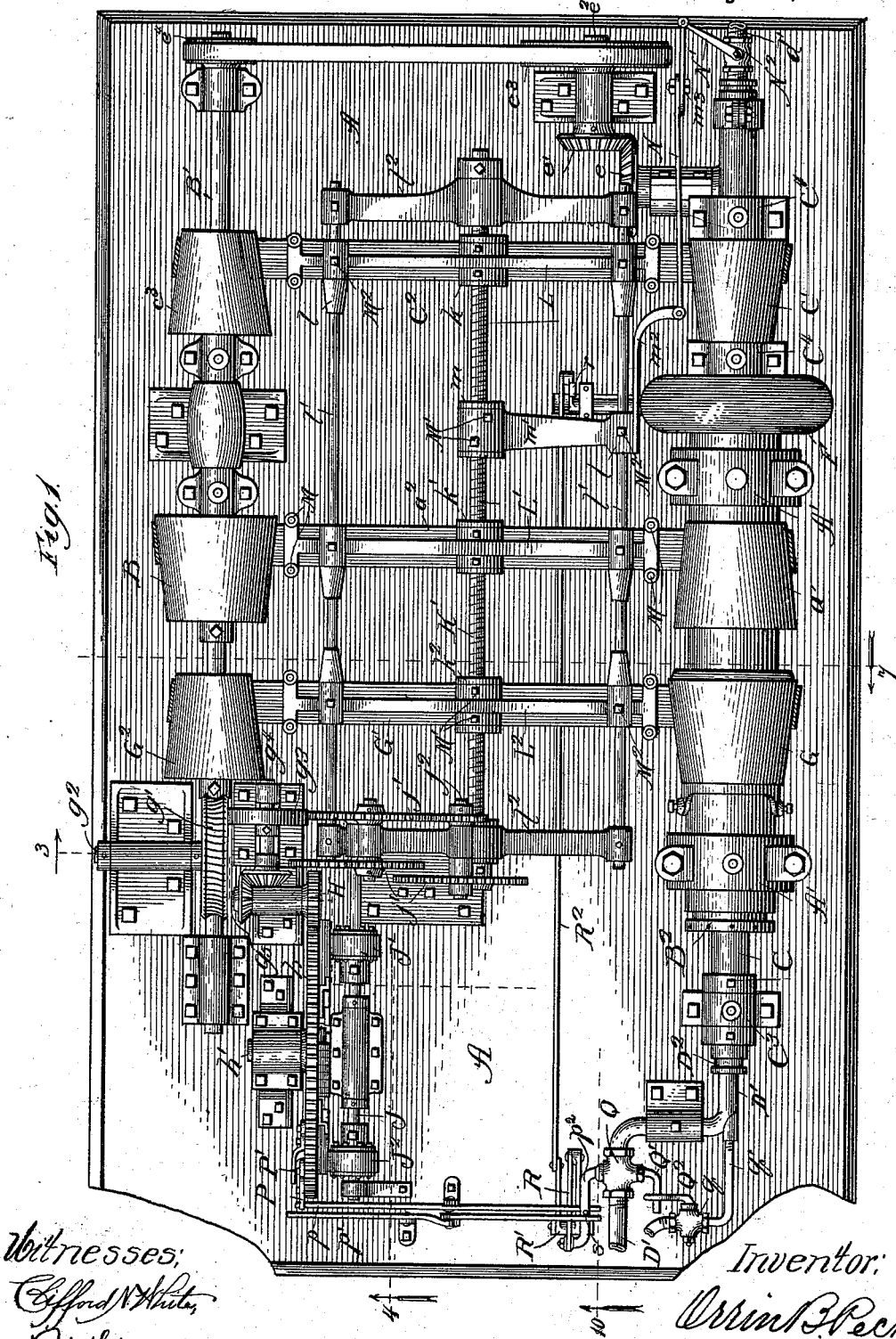

(No Model.) 6 Sheets—Sheet 2.
O. B. PECK.
CENTRIFUGAL SEPARATOR.
No. 560,621. Patented May 19, 1896.
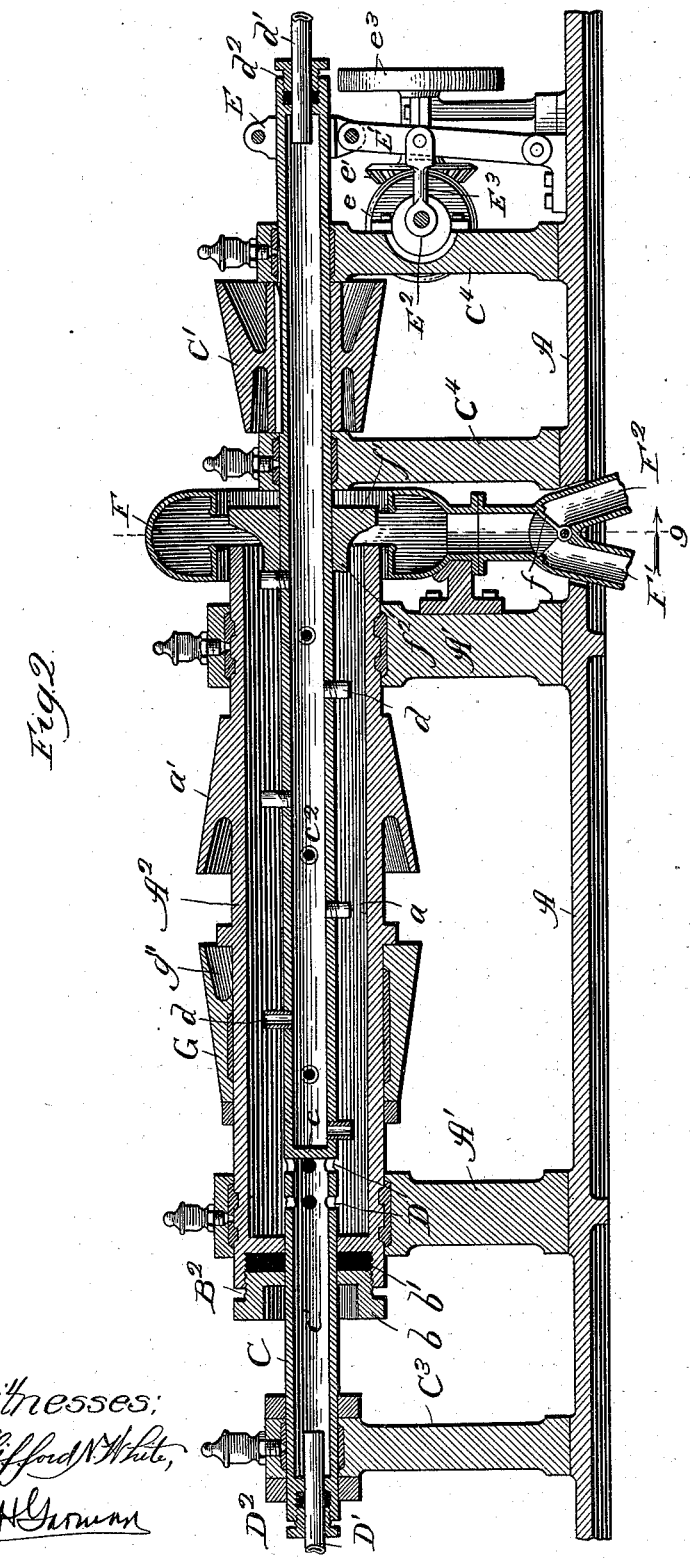
Witnesses:
Clifford N. White
R. H. Garman
Inventor:
Orrin B. Peck
ANDREW B. GRAHAM, PHOTO-LITHO. WASHINGTON, D.C.

(No Model.) 6 Sheets—Sheet 3.
O. B. PECK.
CENTRIFUGAL SEPARATOR.
No. 560,621. Patented May 19, 1896.
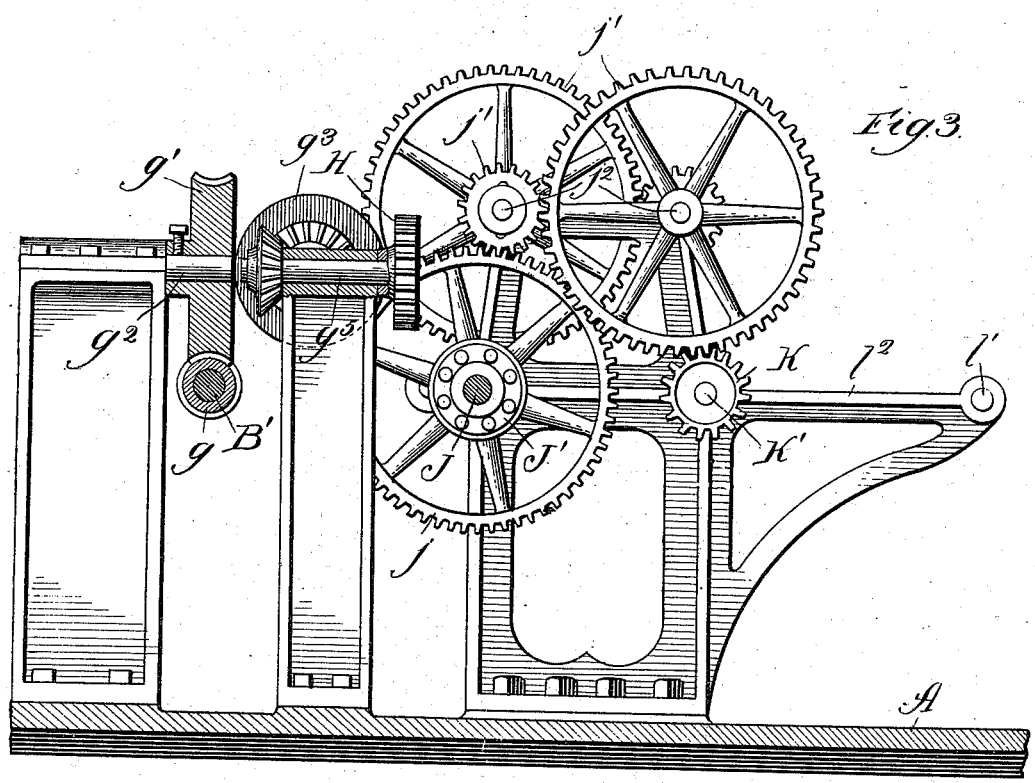
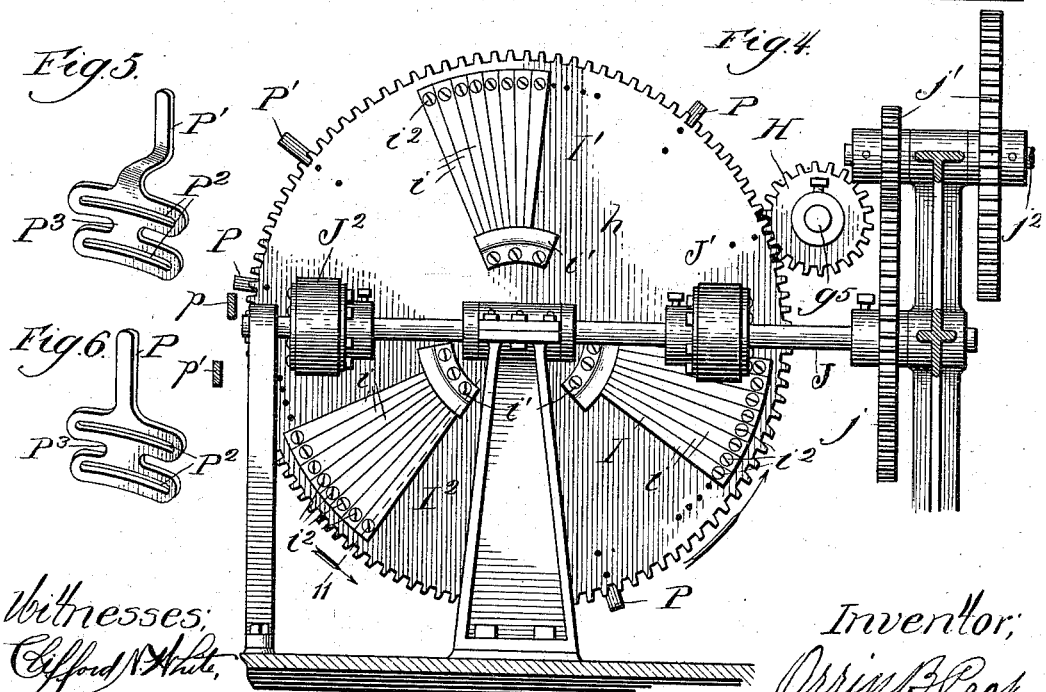
Witnesses:
Clifford N. White,
R. H. Garman
Inventor:
Orrin B. Peck (No Model.) 6 Sheets—Sheet 4.
O. B. PECK.
CENTRIFUGAL SEPARATOR.
No. 560,621. Patented May 19, 1896.
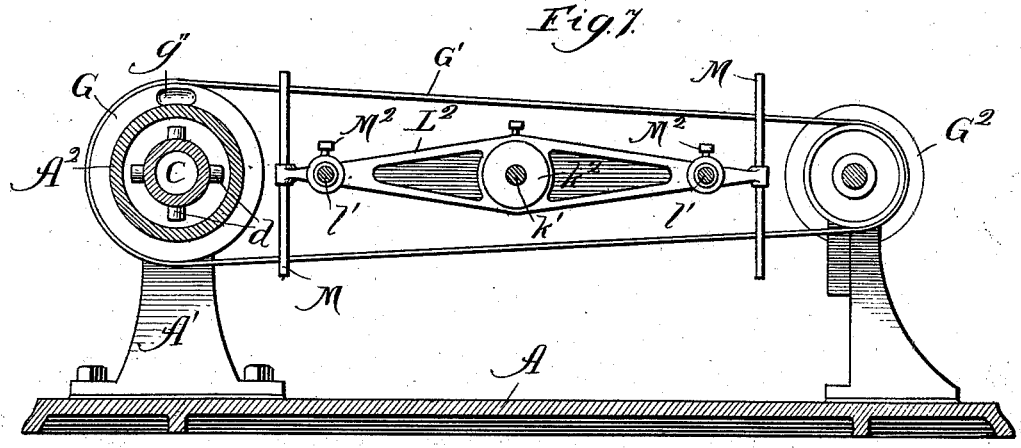
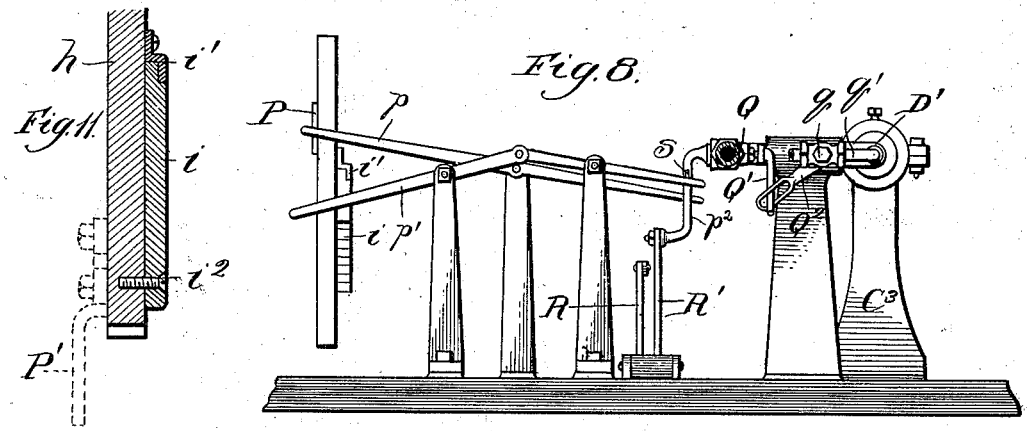
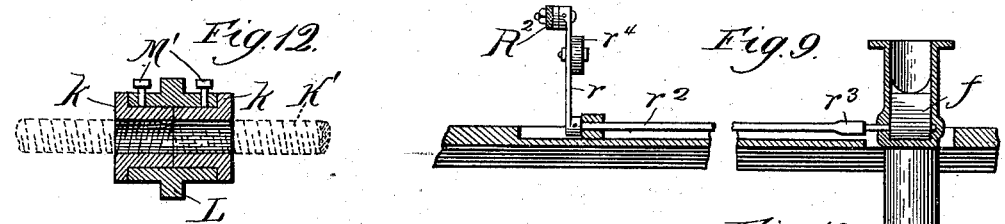
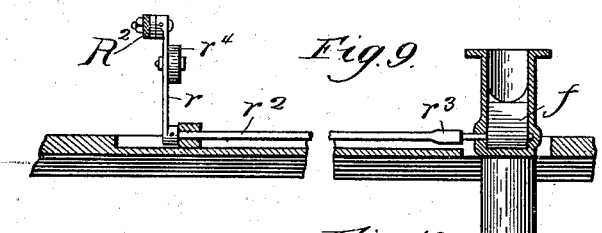
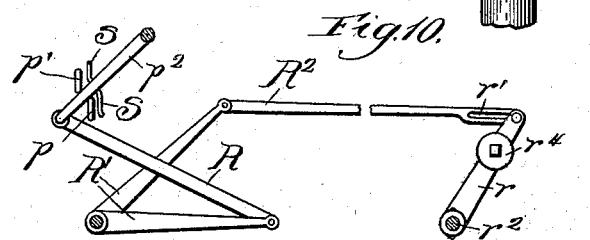
Witnesses:
Clifford N. White
R. H. Garman
Inventor:
Orrin B. Peck

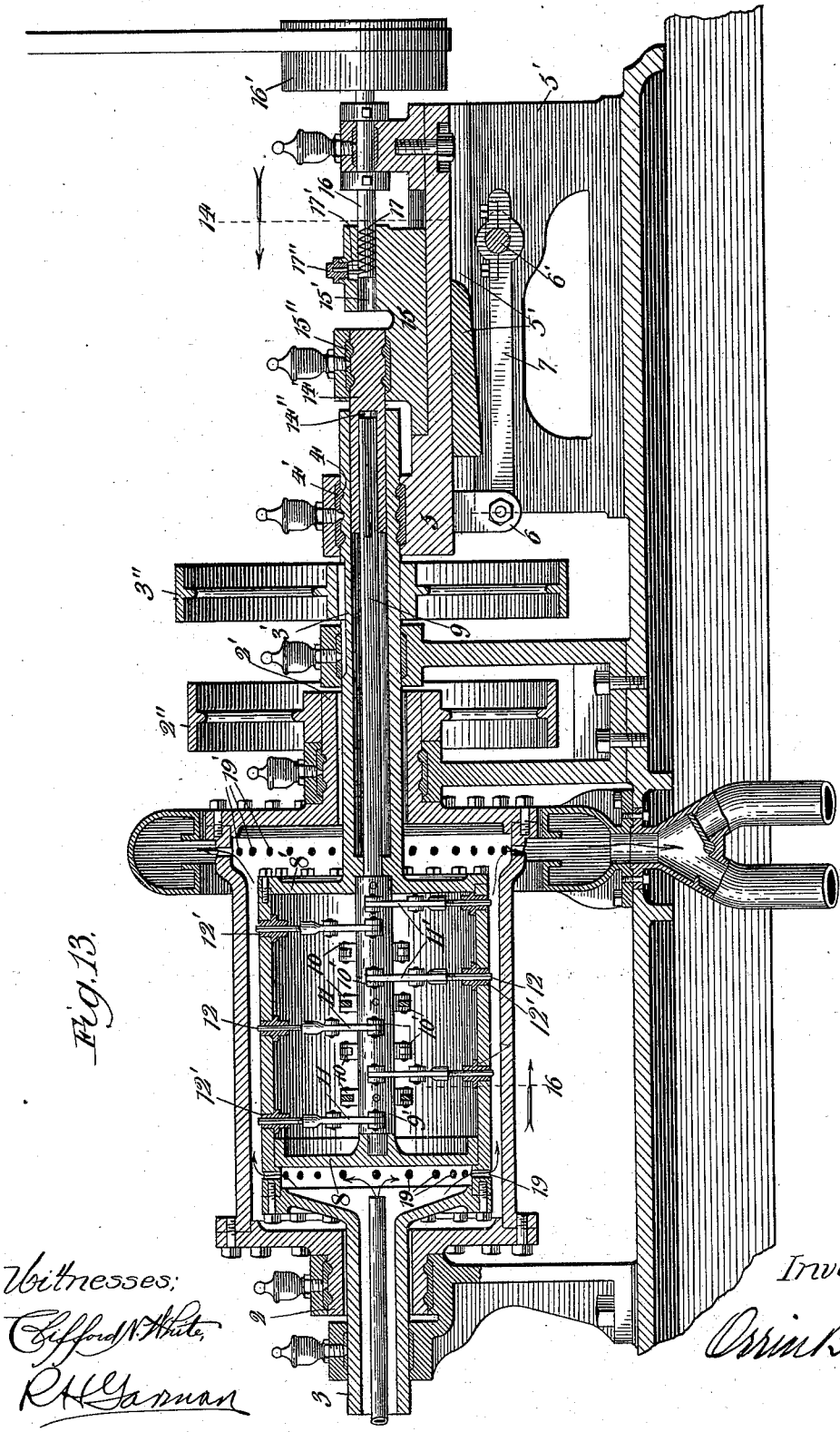

(No Model.) 6 Sheets—Sheet 6.
O. B. PECK.
CENTRIFUGAL SEPARATOR.
No. 560,621. Patented May 19, 1896.
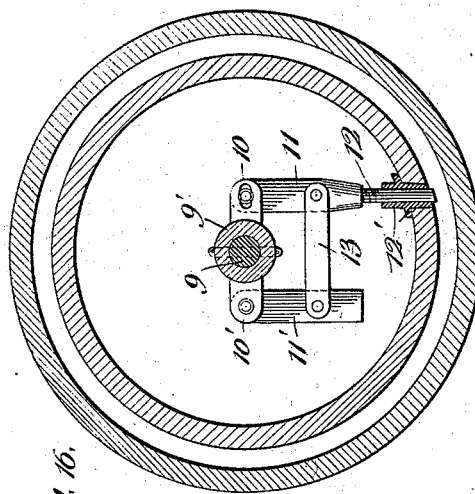
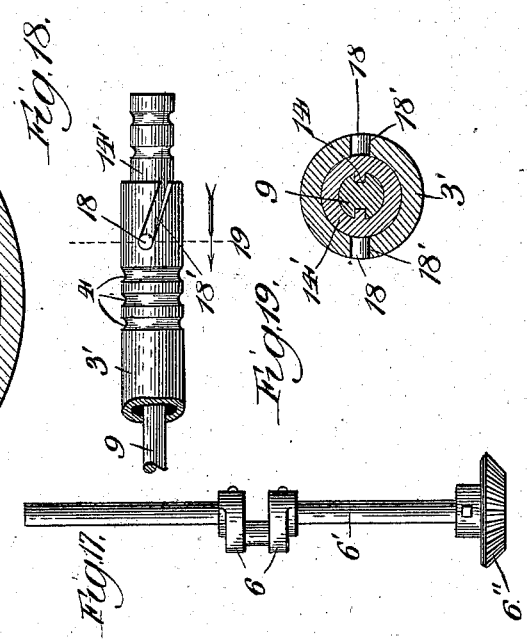
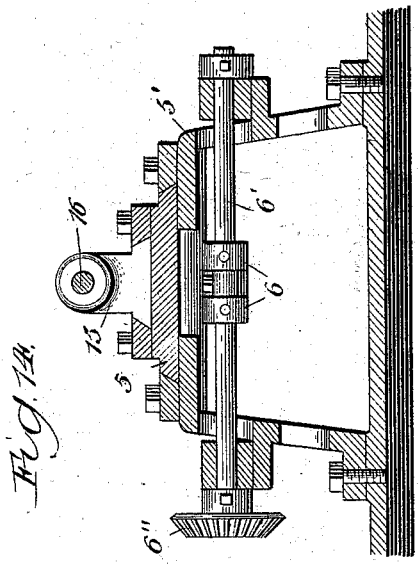
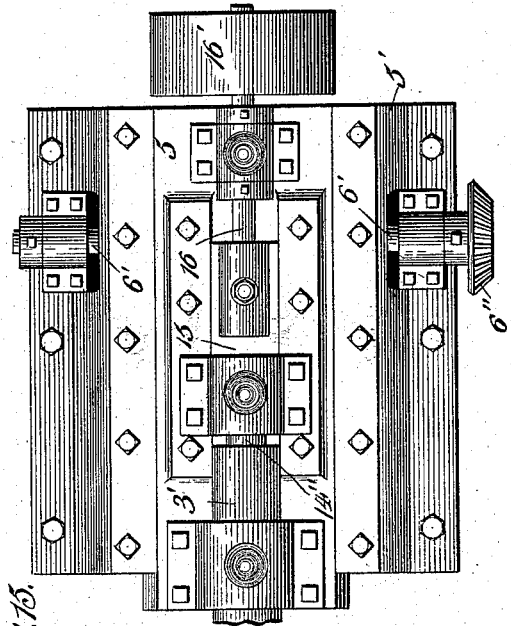
Witnesses:
Inventor,

UNITED STATES PATENT OFFICE.

ORRIN B. PECK, OF CHICAGO, ILLINOIS, ASSIGNOR TO MELINDA PECK, OF SAME PLACE.

CENTRIFUGAL SEPARATOR.

SPECIFICATION forming part of Letters Patent No. 560,621, dated May 19, 1896.

Application filed March 28, 1894. Serial No. 505,411. (No model.)

*To all whom it may concern:*

Be it known that I, ORRIN B. PECK, a citizen of the United States, residing at Chicago, in the county of Cook and State of Illinois, have invented a new and useful Improvement in Centrifugal Separators, of which the following is a specification.

My invention relates more particularly to improvements in centrifugal ore-separators; and the principal object of my improvement is to provide an apparatus for effecting a more perfect separation of materials of different degrees of specific gravity while in a finely-divided state and their separate discharge by subjecting them to centrifugal force and agitation. I attain this object by the mechanism illustrated in the accompanying drawings, in which—

Figure 1 is a top plan view of the entire machine. Fig. 2 is a central vertical longitudinal section through the treatment vessel. Fig. 3 is a transverse section on the line 3 of Fig. 1. Fig. 4 is a longitudinal section on the line 4 of Fig. 1. Figs. 5 and 6 are perspective views of the striking-fingers P P'. Fig. 7 is a transverse section on the line 7 of Fig. 1. Fig. 8 shows an elevation of the mechanism for actuating the feed-valves. Fig. 9 is a transverse section on the line 9 of Fig. 2. Fig. 10 is a longitudinal section on the line 10 of Fig. 1, showing the mechanism for actuating the discharge-valve. Fig. 11 is a sectional detail on the line 11 of Fig. 4. Fig. 12 is a longitudinal sectional detail through the center of one of the belt-shifting bars. Fig. 13 is a central vertical longitudinal section through the treatment vessel of another form of my improved machine. Fig. 14 is a transverse section on line 14 of Fig. 13. Fig. 15 is a top plan view of the reciprocating mechanism of Fig. 13. Fig. 16 is a transverse section on the line 16 of Fig. 13. Fig. 17 is a detail showing a top plan view of the crank-shaft 6'. Fig. 18 is a detail showing a portion of the mechanism for projecting and withdrawing the agitating-pins. Fig. 19 is a transverse section on the line 19 of Fig. 18. All sections are taken in the direction indicated by the arrows.

Similar letters and numerals refer to like parts throughout the several views of the drawings.

A designates a base-plate, on which is supported, by standards A' A', in which it is journaled, the treatment vessel $A^2$, preferably of cylindrical form, and provided with an interior separating-surface $a$. This vessel has upon its exterior a conical belt surface or pulley $a'$, by which it is rotated by a belt $a^2$ from the cone-pulley B on the counter-shaft B', preferably journaled in standards on the base-plate and driven from any suitable source of power.

The treatment vessel or separating-cylinder is preferably closed at the feed end by a packing or stuffing box $B^2$, through which passes an inner, preferably hollow, agitating cylinder or shaft C, journaled in standards $C^3$ $C^4$ $C^4$, permitting both rotation and reciprocation, and rotated by a cone-pulley C' driven by a belt $C^2$ from the cone-pulley $c^3$ on the counter-shaft. The rotation of this agitating-cylinder is at a different rate of speed from the outer cylinder, preferably faster, causing the aqueous and mechanical agitating means carried thereby to travel circumferentially with respect to the separating-surface. This cylinder forms with the separating-cylinder an intermediate channel or passage and serves to deflect or guide the material under treatment along near the separating-surface. The stuffing-box $B^2$ is provided with a circular threaded gland or plug $b$, which may be screwed in toward the elastic packing $b'$, compressing it and thus insuring a practically water-tight joint.

The inner cylinder is divided by a partition $c$ into two sections $c'$ $c^2$. The former is supplied with orifices D, through which material in a finely-divided state and mingled with a liquid, preferably water, introduced by a pipe or conduit D', passing through the stuffing-box $D^2$, similar to $B^2$, is fed to the treatment vessel at or near the end. This supply is under sufficient head to create a pressure through the vessel, and as the feed end thereof is closed by the stuffing-boxes in a water-tight manner it is compelled to exert itself in a direction toward the opposite or discharge end of the vessel. Section $c^2$ is provided with orifices or perforations along over the separating-surface, in which are preferably screwed or otherwise secured hollow projections or tubes $d$. Through these pipes are forced jets of a liquid, preferably water, supplied by a pipe or conduit $d'$, passing through a stuffing-box $d^2$. These jets assist in agitating the material by their impact for the purpose of bringing and keeping lighter substances in suspension in the liquid, or assisting in moving them toward the point of discharge, and later by their increased impact in dislodging the heavier for removal. These tubes also, in their movement through the liquid and suspended material, act by direct contact to mechanically agitate the lighter portion and maintain it in suspension, and also when their rate of travel is increased to aid in the discharge of heavier substances.

The agitating-cylinder has secured to it, beyond the outer standard $C^4$, a collar E. To this collar is pivoted a lever $E'$, pivotally connected at its lower extremity to the base-plate. To the standard $C^4$ is secured a box in which is journaled a transverse crank or eccentric shaft $E^2$, having at one end a crank disk or eccentric whose connecting-rod $E^3$ is pivoted to the lever $E'$, near its center. On the other end of the shaft is a bevel-gear $e$, which meshes with another smaller bevel-gear $e'$ on a short shaft $e^2$, supported in a standard on the base-plate. Upon the other end of the shaft $e^2$ is a large pulley $e^3$, belted to a small pulley $e^4$ on the end of the counter-shaft $B'$. This gearing causes a comparatively slow longitudinal reciprocation of the agitating-shaft in a direction transverse to the path of rotation of the separating-surface, thus causing the projections or tubes to travel with relation thereto, preferably bringing the whole of such surface under the agitating impact of their jets and the entire body of liquid and suspended material under the mechanical agitation of the moving tubes. The longitudinal movement of said tubes in itself produces an additional agitating effect. The pulley $C'$ is secured to the cylinder by a spline and groove, allowing the reciprocation of the cylinder through it, while it is held against the longitudinal play by the standards $C^4$ $C^4$, against which its extended hubs abut.

The treatment vessel discharges into a hood F, which communicates with branch pipes $F'$ $F^2$, conducting lighter and heavier substances, respectively, to suitable receptacles, the passage from the hood to the pipes being controlled by a valve $f$, which is automatically operated, as hereinafter described. Within the hood, keyed to the cylinder, is preferably placed a circular plate $f'$, which deflects the material discharged from the treatment vessel into the hood. This plate preferably has extending a short distance into the vessel a cylindrical portion $f^2$ of smaller diameter, which partially closes the exit therefrom, so that sufficient resistance is offered to the discharge of material and liquid to maintain the channel or passage practically full and keep the material on the separating-surface in a state of submergence, allowing the suspension of the lighter portion.

On the exterior of the treatment vessel, held between a fixed and a movable ring, is mounted the loose cone-pulley G, which is rotated by a belt $G'$ from a pulley $G^2$ on the counter-shaft. This pulley is recessed at one side of its end of largest diameter, as shown at $g''$ in Figs. 2 and 7. This unequal distribution of weight serves to impart in its rotation a vibration to the treatment vessel, assisting in separating the lighter from heavier material, and when its speed of rotation is increased, as hereinafter described, also aids in discharging the latter.

To accomplish the separation of material in the treatment vessel and the separate discharge of lighter and heavier substances in the particular form of the mechanism described and illustrated, the speed of rotation of the separating-cylinder, agitating-cylinder, and vibrating-pulley, the periods of introduction of material and liquid through pipe $D'$ and liquid through the pipe $d'$, and the operation of the discharge-valve are preferably automatically controlled and periodically or intermittently operated by the mechanism which will now be described. These actions might, however, be otherwise effected—manually, if desired.

On the counter-shaft $B'$ is fixed a worm $g$, engaging a worm-wheel $g'$, mounted on a stub-shaft $g^2$, and having its inner face adapted to be utilized as a friction-contact surface or disk. Against this surface bears a friction wheel or roller $g^3$, adjustably secured by a set-screw upon a short longitudinal shaft $g^4$. This shaft has at its opposite end a bevel-gear meshing with a similar gear upon a transverse shaft $g^5$, which also carries a small spur-gear H, engaging teeth upon the periphery of a large wheel $h$ on a stub-shaft $h'$, rotating it at a comparatively slow rate of speed. By adjusting the friction-roll toward or from the center of the worm-wheel the relative speed of the counter-shaft and the parts it actuates through the worm-gearing may be varied within the desired limits. One face of the wheel $h$ serves as a friction surface or disk and carries three sets I, $I'$, and $I^2$, of small movable friction-plates $i$, which are secured to the face of the gear at their inner ends by flanged brackets $i'$ and at their outer by screws $i^2$, engaging a series of holes. By changing the number and position of these plates the surface of frictional contact may be varied both in length and position. On a shaft J, suitably journaled in a position parallel with the face of the wheel $h$, are mounted two friction wheels or rolls $J'$ $J^2$, adjustably secured thereon by set-screws and alternately engaging with the friction-plates during the rotation of the wheel. On the end of shaft J is a gear $j$, which communicates through a train of speed-up gears $j'$ on the short longitudinal shafts $j^2$ with a gear K, mounted near the end of a longitudinally-extending threaded rod K'. This rod is supported for rotation in standards, preferably mounted on the base-plate, and carries along its length internally-threaded sleeves $k$ $k'$ $k^2$, upon which are mounted the transversely-extending belt-shifting bars L L' L², which are supported at their outer ends by sleeves $l$, sliding freely upon the rods $l'$, supported by the cross-bars $l^2$. Upon the ends of bars L L' L² are vertical pins M, engaging the opposite sides of the belts C² $a'$ G', which communicate rotation to the treatment vessel, the inner cylinder, and the vibrating-pulley, respectively. As the wheel $h$ is rotated by the intermediate gearing the sets of friction-plates on its surface engage the friction-wheels J' J² and through the speed-up gearing cause the threaded rod to be rapidly rotated alternately in opposite directions, with greater or less intermediate periods of rest, thus causing the belt-shifting bars to travel along the rod in accordance with this rotation and move the belts from one end of the cone-pulleys C, $a'$, and G to the other, increasing and decreasing the speed of rotation with intermediate periods of constant speed. These pulleys are so arranged on their respective cylinders that for an increase of speed of C and G that of $a'$, which is tapered in the opposite direction, is decreased for the reason hereinafter stated. The threaded sleeves $k$ $k'$ $k^2$ are preferably made in two parts, as shown in Fig. 12, and upon each of these bears a set-screw M', passing through the belt-shifting bar. If it be desired that any one of the belts shall remain stationary in its movement along the surface of the cone-pulley, maintaining the speed of rotation of one or more parts constant while the others are varied, the set-screws are loosened, thus allowing the sleeve to turn freely in the bars and preventing their travel along the threaded rod. At the same time set-screws M² in the sleeves $l$ are tightened to engage the rods $l'$, thus insuring the belt-shifting bars remaining stationary. The rod K' also carries another threaded sleeve $m$, upon which is mounted a bar $m'$, extending in one direction only, and supported at its outer end by a sleeve $l$ similar to the others. To this bar is secured a rod $m^2$, to which is pivoted a connecting-rod N, pivotally connected at its opposite end to a lever N' on the stem of the clear-agitating-liquid valve N² in the pipe $d'$. The rod N is of adjustable length, being made in two parts, secured together by a bolt $m^3$, passing through slots in their adjacent ends. The bar $m'$ being caused to travel back and forth by the rotation of the rod K' within its threaded sleeve causes the valve N² to be alternately opened and closed by the interposed rods and levers. It may be thrown out of action, if desired, by an arrangement precisely similar to that employed with the belt-shifting bar.

Upon the opposite surface of the wheel $h$ from that which carries the friction-plates are preferably three sets of two adjustable contact portions or fingers P P', which are secured to the face of the wheel by screws passing through slots P² in an enlarged portion P³, the slots permitting an adjustment of the fingers circumferentially of the wheel. The finger P lies in the same plane as its enlarged portion and projects close to the face of the wheel, while the finger P' is bent twice nearly at right angles, which causes it to project in a plane at a slight distance from the surface. It has also a greater radial length. These fingers, respectively, engage the end of levers $p$ $p'$, the former being a simple lever pivoted at its center upon a standard mounted on the base-plate, while the lever $p'$ is compound, its two sections being mounted upon two similar standards. The opposite ends of these levers contact with the lower and upper sides, respectively, of a lever $p^2$, extending at right angles from the end of the stem of the material-feeding valve Q in the pipe D'. The opposite extremity of the valve-stem carries a lever Q', the lower end of which projects through a slot in the end of a lever Q², fixed to the stem of the liquid-valve $q$ in the pipe $q'$, communicating with the pipe D' at a point between the valve $q$ and the treatment vessel.

To the outer extremity of the lever $p^2$ is pivoted a rod R, connected to one member of a bell-crank lever R', pivoted to the base-plate, to the other arm of which is pivotally attached a long connecting-rod R², leading to the upper extremity of a lever $r$, to which it is attached by a bolt passing through a slot $r'$. The lower end of the lever $r$ is secured to a rod $r^2$, having a socket $r^3$ at its opposite end, in which is secured, by means of a set-screw, the stem of the discharge-valve $f$. By changing the point of attachment of the lever $r$ to the rod R² and by turning the valve-stem in its socket the extent of movement of the valve $f$ may be adjusted and its relative time of action to the other elements varied. A weight $r^4$ near the upper end of the lever $r$ assists in throwing it in one direction or the other. As the levers $p$ $p'$ are moved downward by the contact of the fingers P P' they respectively raise and lower the lever $p^2$, thus opening and closing the valve Q with intermediate periods during which it is stationary. The lever $p^2$ carries upon its upper and lower surfaces small pins S, which serve to prevent the slipping of the levers $p$ $p'$ as they engage it. As the valve Q is actuated it also in turn opens and closes the liquid-valve $q$, through the intervention of the levers Q' and Q², at the same time the discharge-valve $f$ is operated by the bell-crank lever and its connecting-rods and levers.

The pipes D', $d'$, and $q'$ are connected to elevated reservoirs, pumps, or other sources of supply for securing a suitable head of material and liquid to obtain the pressure through the cylinder and the proper force of jets of liquid from the pipes or tubes $d$. Manually-operated valves might be arranged between these sources and the separator to govern the pressure irrespective of the position of the automatic valves.

The operation of the device is as follows: The valve Q being open to its fullest extent, ore in a finely-divided state and mingled with a liquid, preferably water, is fed into the treatment vessel, which is being rotated at a speed sufficient to develop the desired degree of centrifugal force, in sufficient quantities to fill the channel or passage between the inner cylinder and the separating-surface and under such a head as to create a pressure therethrough. Here the centrifugal force causes the material to move toward a position around the circumference of the vessel and the heavier to lodge upon the separating-surface. The material in suspension in the liquid within the channel and the surface of the accumulated material are also subjected to opposing forces, of preferably approximately constant degree, in the form of the aqueous agitating force of the liquid jets, the valve $N^2$ being partially open, to the mechanical agitation produced by the compound movement of the tubes through the liquid, and to the vibration of the separating-surface, resulting from the rotation of the recessed pulley. These disturb or agitate the material, permitting the heavier portion to be precipitated and causing the lighter to be partially or wholly suspended in the liquid and moved along toward the outlet with the flow produced by the pressure through the vessel. The discharge is received by a pipe F' and conveyed to a suitable receptacle. It will not be found necessary at all times, however, to employ all of the above-mentioned opposing forces, as they may be used separately or conjointly and of greater or less degree, as may best be adapted to the particular conditions or material under consideration. It is evident that the more violent the agitation with relation to the centrifugal force developed during the separating period the heavier will be material discharged during such period, and vice versa.

The separation being accomplished, the valves and gearing are in the position shown in the drawings, and heavier material is now to be automatically discharged. The group I of friction-plates in its upward movement, as shown in Fig. 4, engages the friction-wheel J' and causes it to rotate, through the intermediate gearing, the longitudinal threaded rod, thus moving the threaded sleeves and the bars that they support, shifting the belts to the opposite ends of the cone-pulleys, and opening wide the valve $N^2$. At the same time the finger P strikes the end of lever P, which, by means of the system of levers already described, closes the material-valve Q, opens the clear-liquid valve $q$, and shifts the position of the discharge-valve. As a result of these changes the supply of material is shut off from the treatment vessel and the speed of rotation of said vessel is decreased, causing the heavier substances to be held less forcibly against the separating-surface and permitting them to be dislodged by the increased agitation and vibration. At the same time the pressure through the vessel is so intensified by the maximum supply of liquid through the pipes $q'$ $d'$ that the heavier substances are washed from the separating-surface out of the treatment vessel and discharged into the pipe $F^2$, which conveys them to a separate receptacle. This position of parts and constant degree of forces for discharge are maintained until the group I' of friction-plates in its downward movement engages the friction-roll $J^2$, causing the opposite rotation of the rod K', which, with the striking-finger P' against the lever $p'$, restores the elements to their former condition, and the period of separation follows.

By means of adjustments and changes in the various parts of the mechanism the length and frequency of the periods of operation of the elements, the intensity of the applied forces, and their relation one to the other may be varied within the desired limits.

By suitably adjusting the position of the friction-roll $g^3$ toward or from the center of the worm-gear the relative speed of rotation of the counter-shaft and the longitudinal threaded rod may be varied, thus varying relatively the rate of speed of rotation of the pulleys C, $a'$, and G and the rate of change in said speed, and consequently between the intensity of centrifugal force, agitation, and vibration, and the change in said intensity. This adjustment also changes the frequency with which the fingers strike the valve-actuating levers, altering the frequency and length of the periods during which material and liquid are fed to the treatment vessel, irrespective of the speed of rotation of the counter-shaft. The relation of these may be further controlled by the circumferential movement of the fingers on the face of the disk, while the time and extent of movement of the discharge-valve may be independently adjusted by the point at which its lever is attached to the connecting-rod and the movement of its valve-stem in the connecting-socket.

The adjustment of the contact-surfaces I I' $I^2$ and the friction-wheels engaging therewith furnishes a means for varying the intensity and time of application of the centrifugal force, agitation, and vibration collectively to vary the periods of separation and removal. If, for example, it is desired to gradually change the speed of rotation of the separating-surface, agitating-cylinder, and vibrating pulley during the period of separation and then almost immediately decrease them to the initial point during the period of removal of heavier substances, the contact-surfaces may be sufficiently increased by adding the removable plates and the friction-wheels moved well in toward the center of the wheel $h$. As a result one of the wheels will be in frictional engagement with the contact-surfaces a greater part of the time, actuating the belt-shifters almost continuously, alternately in opposite directions, effecting the required change; or if it is desired to maintain the speed of rotation of these parts approximately constant during the periods of separation and removal, but at different rates, plates are removed from each of the contact-surfaces and the friction-rolls moved toward the periphery of the wheel, giving substantially the arrangement illustrated in the drawings, when the wheels will be alternately engaged and oppositely rotated with intermediate periods of rest, thus shifting the belt to one end of the actuating cone-pulley and rotating the parts at a constant rate for separation, and then to the other end thereof, varying the speed to the required amount for discharge and maintaining them there until the cycle of operations recommences.

By setting any one of the belt-shifting bars along the threaded rod the timing of the movements of the parts it actuates will be changed with respect to its fellows. The rotation of any one pulley may be maintained constant by throwing out of action and fixing its belt-shifting bar, or any one of the pairs of pulleys may be removed and others substituted or the pulleys reversed in position on the shaft, thus making the change in its speed of rotation opposite to the others. The setting of the bar $m'$ on the rod $K'$ and the variation in the length of the rod N adjust the periods of action of the valve $N^2$.

In the form illustrated in Figs. 13 to 19, inclusive, the treatment vessel is journaled in suitable standards by hollow trunnions 2 2', the latter having secured thereto a belt-pulley 2", by which it is rotated. Through these trunnions project the hollow trunnions 3 3', suitably journaled in standards and supporting the inner hollow agitating frame or cylinder and deflector. The trunnion 3' carries a belt-pulley 3", by which the interior cylinder is rotated at a different speed than the treatment vessel, preferably faster. Near the outer end of trunnion 3' are a series of external circumferential grooves 4, which are engaged by a flanged bushing 4', this bushing being carried by a sliding plate 5, which is supported in suitable guides upon a table 5'. On the lower side of the plate are a pair of depending lugs 6, and journaled in the table beneath the sliding plate is a crank or eccentric shaft 6', driven by a gear 6'', connected to any source of power. A connecting-rod 7 extends from the crank to the depending lugs, and when the shaft is rotated causes the reciprocation of the sliding plate, carrying with it the inner cylinder or deflector, thus giving thereto a movement of longitudinal reciprocation, as well as the rotation imparted to it by the pulley 3". This pulley is secured to the trunnion by a spline and groove to allow the longitudinal reciprocation of the latter. In plates 8 8', closing the opposite ends of the inner cylinder, is journaled a shaft 9, which carries on the portion within the cylinder a long sleeve 9', secured to the shaft to rotate therewith, and having along its surface oppositely-extending pairs of perforated lugs 10 10'. The lugs 10 have pivoted thereto a bar 11, to which are secured the agitating-pins 12, projecting outward, preferably through wearing-sleeves 12', placed in orifices in the surface of the inner cylinder. The lugs 10' have pivoted to them a counterweight 11', which is connected by a bar 13 to the pin-bar 11. The purpose of this counterweight is to counteract the outward thrust of the pin-bars produced by the action of centrifugal force, and thus relieve the strain upon the operating parts. The shaft 9 extends through the plate 8', and is secured at its outer end by a double spline and groove to a short shaft 14', extending within the trunnion 3' and having a cylindrical recess at 14", into which the shaft 9 projects. This shaft 14' is provided, like the trunnion 3', with external circumferential grooves engaging a flanged bushing which is supported upon a sliding block 15, mounted in guides upon the upper surface of the plate 5. The outer extremity of block 15 is cylindrically perforated at 15', and into this perforation extends the end of a short shaft 16, suitably journaled on the plate 5 and rotated by means of a belt on the broad pulley 16'. The end of the shaft 16 which is within the perforation has upon its surface a right and left handed continuous spiral groove 17, and into this groove projects a pin 17', mounted in a screw-plug 17", held in a block above the shaft. On the shaft 14' are two pins 18, (see Figs. 18 and 19,) which project through inclined slots 18' in the outer end of the trunnion 3' of the interior cylinder. The shaft 16 being continuously rotated, the engagement of the pin 17' with the continuous spiral groove causes the independent reciprocation of the block 15 from the sliding plate 5, which results in the pins 18 being forced through the inclined slots, causing by their thrust the shaft 9 to be rotated slowly ahead of the trunnion 3'. By this movement the bars 11 are moved outwardly radially, projecting the agitating-pins through the holes in the inner cylinder, and upon the backward travel of block 15 withdrawing them by the movement of the pins toward the opposite ends of the slots. The operation is so timed that when the period of separation begins the pins are extended to their outmost limits. Then as separation progresses and the material accumulates on the separating-surface they are slowly withdrawn, maintaining the degree of agitation approximately constant in the narrowing channel and keeping lighter substances in suspension without disturbing the heavier. As the period of separation approaches its end the pins will have been withdrawn to their inmost point and the heavier substances are now discharged by projecting them toward or into the accumulated material, agitating or disturbing it sufficiently to allow its discharge by an increased flow of liquid. In this modification the material and liquid are fed to the separating-surface through orifices 19 at the feed end of the interior cylinder and the material separately discharged through orifices 19' at the opposite end of the treatment vessel. The mechanism for automatically actuating the feed and discharge valves and varying the speeds of rotation already described in connection with the other figures might be likewise employed here, and has therefore not been illustrated.

Although the term "cylindrical" has been applied throughout to the separating vessel and the agitating-shaft, this is not absolutely essential to the operation of the machine, and any other might be employed by which the desired result would be obtained. It is to be understood that the word is used in this generic sense in both description and claims.

It will be seen that when the term "periodically" is applied to the intervals during which separation and the discharge of heavier substances occurs, to the times of supplying material and liquid, and applying the separating forces, it is not necessarily used in the sense of equal, but of varying or intermittent periods.

It is obvious that many changes and modifications in the details of construction of the various parts of the mechanism herein described may be made as desired by the constructor, or to best suit the varied conditions under which the machine is operated, without departing from my invention.

In my applications, Serial Nos. 505,410, 505,413, and 505,418, filed March 28, 1894, I claim certain features shown and described, but not claimed herein.

What I claim as my invention, and desire to secure by Letters Patent, is—

1. In a centrifugal separator, the combination of a rotatable separating-surface, and means to effect agitation of material thereover, movable in a direction transverse to the path of rotation of such surface upon a deflector or cylinder maintained at a constant distance therefrom, substantially as described.

2. In a centrifugal separator, the combination of a rotatable separating-surface, and rotatable means to effect agitation of material thereon, movable in a direction transverse to the path of rotation of such surface upon a supporting-body maintained at a constant distance therefrom, substantially as described.

3. In a centrifugal separator, the combination of a rotatable separating-surface, and differentially-rotatable means to effect agitation of material thereon, movable in a direction transverse to the path of rotation of such surface upon a supporting-body maintained at a constant distance therefrom, substantially as described.

4. In a centrifugal separator, the combination of a rotatable separating-surface, and means to effect agitation of material thereon, automatically movable in a direction transverse to the path of rotation of such surface, substantially as described.

5. In a centrifugal separator, the combination with a rotatable separating-surface, of means to effect agitation of material thereover mounted upon a supporting-body maintained at a constant distance from said surface, the two relatively movable in a direction transverse to the path of rotation, substantially as described.

6. In a centrifugal separator, the combination with a rotatable separating-surface of means to effect agitation of material thereon, the two relatively automatically movable in a direction transverse to the path of rotation, substantially as described.

7. In a centrifugal separator, the combination of a rotatable separating-surface, and agitating means automatically reciprocating in a direction transverse to the path of rotation, substantially as described.

8. In a centrifugal separator, the combination of a rotatable vessel or cylinder, and an agitating shaft or cylinder passing in a water-tight manner through one end thereof, the two relatively movable in a direction transverse to the path of rotation of said vessel, substantially as described.

9. In a centrifugal separator, the combination of a rotatable vessel or cylinder, and a rotatable agitating shaft or cylinder passing in a water-tight manner through one end thereof, the two relatively movable in a direction transverse to the path of rotation of said vessel, substantially as described.

10. In a centrifugal separator, the combination of a rotatable vessel or cylinder, a material-supply pipe or conduit communicating therewith in a manner to secure pressure through the vessel, means for effecting agitation of material within said vessel, and means for effecting endwise movement back and forth of the agitating means, substantially as described.

11. In a centrifugal separator, the combination of a rotatable vessel or cylinder, a rotatable shaft or cylinder extending through the same, such shaft provided with a hollow section communicating with a supply pipe or conduit, having orifices or perforations communicating with the vessel or cylinder through which an agitating effect is produced, and means for effecting endwise movement back and forth of the agitating means, substantially as described.

12. In a centrifugal separator, the combination of a rotatable vessel or cylinder, a material-supply pipe or conduit communicating therewith in a manner to secure pressure through the vessel, a shaft provided with outwardly-extending projections for effecting agitation therein, and means for effecting endwise movement of said shaft back and forth, substantially as described.

13. In a centrifugal separator, the combination of a rotatable separating-surface, means to effect agitation of material thereover, movable in a direction transverse to the path of rotation of such surface upon a deflector or cylinder maintained at a constant distance therefrom, and automatic means for controlling the flow of material to the separating-surface, substantially as described.

14. In a centrifugal separator, the combination of a rotatable separating-surface, means to effect agitation of material thereover, movable in a direction transverse to the path of rotation of such surface upon a deflector or cylinder maintained at a constant distance therefrom, means for supplying liquid thereto, and means for increasing the flow to effect the removal of heavier substances, substantially as described.

15. In a centrifugal separator, the combination of a rotatable separating-surface, means to effect agitation of material thereover, movable in a direction transverse to the path of rotation of such surface upon a deflector or cylinder maintained at a constant distance therefrom, means for supplying liquid thereto, and automatic means for increasing the flow to effect the removal of heavier substances, substantially as described.

16. In a centrifugal separator, the combination of a rotatable separating-surface, and means to effect agitation of material thereover movable toward and from the same, and mounted upon a deflector or cylinder maintained at a constant distance from said surface, substantially as described.

17. In a centrifugal separator, the combination of a rotatable separating-surface, and means to effect agitation of material thereover automatically movable toward and from such surface, substantially as described.

18. In a centrifugal separator, the combination of a rotatable separating-surface, and rotatable means to effect agitation of material thereover movable toward and from the same, and mounted upon a supporting-body maintained at a constant distance from said surface, substantially as described.

19. In a centrifugal separator, the combination of a rotatable separating-surface, and means to effect agitation of material thereover movable longitudinally of the axis of rotation thereof and toward and from the separating-surface, and mounted upon a supporting-body maintained at a constant distance from said surface, substantially as described.

20. In a centrifugal separator, the combination of a rotatable separating-surface, and rotatable means to effect agitation of material thereover movable in a direction transverse to the path of rotation thereof and toward and from the same, and mounted upon a supporting-body maintained at a constant distance from said surface, substantially as described.

21. In a centrifugal separator, the combination of a rotatable separating-surface, and means to effect agitation of material thereover gradually movable toward and from the same during the separating period, and mounted upon a deflector or cylinder maintained at a constant distance from said surface, substantially as described.

22. In a centrifugal separator, the combination of a rotatable separating-surface, and means to effect agitation of material thereover gradually movable therefrom during the separating period, and then toward the same to assist in the removal of heavier substances, and mounted upon a deflector or cylinder maintained at a constant distance from said surface, substantially as described.

23. In a centrifugal separator, the combination of a rotatable vessel or cylinder, an inner perforated frame or cylinder, pins within said perforations, and means for projecting and withdrawing the same, substantially as described.

24. In a centrifugal separator, the combination of a rotatable vessel or cylinder, an inner perforated frame or cylinder, pins within said perforation, and automatic means for projecting and withdrawing the same, substantially as described.

25. In a centrifugal separator, the combination of a rotatable vessel, rotatable agitating means movable along the axis of rotation thereof and engaged by a reciprocating bushing to effect such movement, substantially as described.

26. In a centrifugal separator, the combination of a rotatable vessel, rotatable agitating means movable along the axis of rotation thereof engaged by a reciprocating bushing to effect such movement, and a crank or eccentric shaft to reciprocate the same, substantially as described.

27. In a centrifugal separator, the combination of a rotatable vessel, a perforated frame or cylinder within said vessel, a shaft carrying agitating-pins within said frame, and means for projecting and withdrawing these pins through the perforations, substantially as described.

28. In a centrifugal separator, the combination of a rotatable vessel, a perforated frame or cylinder within said vessel, a shaft carrying agitating-pins within said frame, and means for projecting and withdrawing these pins through the perforations by the differential rotation of the frame and shaft, substantially as described.

29. In a centrifugal separator, the combination of a rotatable vessel, a rotatable frame or cylinder within said vessel, a shaft carrying agitating-pins within said frame and rotatable therewith, and means for rotating the latter ahead of the frame to project and withdraw said pins through the perforations, substantially as described.

30. In a centrifugal separator the combination of a rotatable vessel, a rotatable perforated frame or cylinder within said vessel, a shaft carrying agitating-pins within said frame and rotatable therewith, and a reciprocating shaft for rotating the latter ahead of the frame to project and withdraw said pins through the perforations, substantially as described.

31. In a centrifugal separator, the combination of a rotatable separating-surface, a deflector maintained at a constant distance therefrom, and means carried by said deflector to effect agitation of material over the separating-surface movable toward and from the same, substantially as described.

ORRIN B. PECK.

Witnesses:
M. L. ALLEN,
R. H. GARMAN.